United States Patent [19]
Eichmann

[11] Patent Number: 6,070,713
[45] Date of Patent: Jun. 6, 2000

[54] CAN END FABRICATING SYSTEM INCLUDING AN IMPROVED CONVEYOR BELT DRUM

[75] Inventor: Harry Eichmann, late of Merrimac, Wis., by Carol L. Baier, executor

[73] Assignee: Universal Die & Stampings, Inc., Prairie du Sac, Wis.

[21] Appl. No.: 08/909,371

[22] Filed: Aug. 11, 1997

Related U.S. Application Data

[63] Continuation-in-part of application No. 08/421,186, Apr. 13, 1995, Pat. No. 5,704,754.

[51] Int. Cl.[7] ................................................. B65G 23/06
[52] U.S. Cl. ........................... 198/834; 474/163; 474/164
[58] Field of Search ..................... 198/834; 474/162–164

[56] References Cited

U.S. PATENT DOCUMENTS

| | | |
|---|---|---|
| 3,859,865 | 1/1975 | Conrad . |
| 4,072,062 | 2/1978 | Morling et al. . |
| 4,568,230 | 2/1986 | Brown . |
| 4,568,320 | 2/1986 | Tangorra . |
| 4,640,116 | 2/1987 | Brown . |
| 4,723,882 | 2/1988 | Wiseman et al. . |
| 4,846,774 | 7/1989 | Bell . |
| 4,904,140 | 2/1990 | Herdzina et al. . |
| 4,946,028 | 8/1990 | Eichmann et al. . |
| 5,012,263 | 4/1991 | Tull et al. ................................ 474/164 |
| 5,017,072 | 5/1991 | Herdzina et a l. . |
| 5,142,769 | 9/1992 | Gold et al. . |
| 5,158,410 | 10/1992 | Hunt . |
| 5,259,496 | 11/1993 | Common . |
| 5,704,754 | 1/1998 | Eichmann ............................... 198/834 |

*Primary Examiner*—Joseph E. Valenza
*Attorney, Agent, or Firm*—Foley & Lardner

[57] ABSTRACT

A belt drive assembly for driving a continuous belt having a plurality of drive teeth openings includes a drive shaft, a belt support surface and a plurality of drive teeth. The belt support surface is movably supported relative to the drive shaft so as to move substantially independent of the drive shaft. The plurality of drive teeth are coupled to the drive shaft and extend outwardly from the drive shaft beyond the support surface for being received within corresponding drive teeth openings of the belt.

21 Claims, 5 Drawing Sheets

CAN END FABRICATING SYSTEM INCLUDING AN IMPROVED CONVEYOR BELT DRUM

The present application is a continuation-in-part of U.S. application Ser. No. 08/421,186 filed on Apr. 13, 1995 which issued on Jan. 6, 1998 as U.S. Pat. No. 5,704,754.

FIELD OF THE INVENTION

The present invention relates to systems for fabricating the tops of aluminum cans. In particular, the present invention relates to an improved drive drum for supporting and moving a can end conveyor belt.

BACKGROUND OF THE INVENTION

The top ends of beverage (e.g. beer and soda) cans are formed in high volumes using presses such as those disclosed in U.S. Pat. No. 4,568,230, issued to Omar L. Brown on Feb. 4, 1986, and U.S. Pat. No. 4,723,882, issued to Wissman et al. on Feb. 9, 1988. In general, these presses include a main press having tooling for forming can ends and a continuous, can end transfer belt extending therethrough to carry can end blanks from a supply of blanks, support the can ends during stamping, and transfer the can ends away from the stamping station. The transfer belts are typically fabricated from a material such as stainless steel and include carrier openings. (U.S. Pat. No. 4,946,028, issued to Eichmann et al. on Aug. 7, 1990, and U.S. Pat. No. 5,158,410, issued to George D. Hunt on Oct. 27, 1992, disclose such transfer belts.)

The transfer belts are typically supported between two drums. One of the drums is an idler drum and the other drum is a drive drum including drive teeth. The drive drum is rotated by an appropriate drive train and motor, and the teeth of the drum cooperate with carrier openings in the transfer belt to index the belt and associated can ends through the press.

One reason for using metal transfer belts is to maintain tight tolerances while stamping can ends. Furthermore, to maintain tight tolerances, it is also important that the drive teeth and carrier openings are closely matched so that accurate control of the drive motor will result in precise indexing of the transfer belt. The importance of accuracy resulted in the use of drive teeth and carrier openings rather than just the friction force between the transfer belts and the drive drum. However, as a result of operation, the frictional force between the drive drums and drive belts acts to wear the carrier openings and/or the drive teeth. This wear is a result of the drive teeth exerting high forces against the carrier openings to slide the belt against the friction force when the teeth and openings become misaligned during operation. As a result of wear of the teeth and/or openings, the accuracy of belt indexing decreases until the belt must be discarded. In the case of many can end presses belts are discarded on a weekly basis.

In view of the problems discussed above, it would be desirable to provide and improved transfer belt drive mechanism which reduces the wear between the drive teeth and the associated carrier openings of the belt.

SUMMARY OF THE INVENTION

The present invention is directed to a belt drive assembly for driving a continuous belt having a plurality of drive teeth openings. The belt drive assembly includes a drive shaft, a belt support surface and a plurality of drive teeth. The belt support surface is movably supported relative to the drive shaft so as to move substantially independent of the drive shaft. The plurality of drive teeth are coupled to the drive shaft and extend outwardly from the drive shaft beyond the support surface for being received within corresponding drive teeth openings of the belt.

The present invention is more specifically directed to a belt drive assembly wherein the belt support surface rotatably moves substantially independent of the drive shaft. The present invention is also more specifically directed to the belt drive assembly wherein the belt support surface axially moves substantially independent of the drive shaft. In a preferred embodiment, the belt support surface rotatably and axially moves independent of the drive shaft.

The present invention is also more specifically directed to the aforementioned belt drive assembly including a drum non-rotably coupled to the drive shaft about the drive shaft and a bearing between the belt support service and the drum for movably supporting the belt support service independent of the drum. The bearing preferably includes a plurality of ball bearings disposed between the drum and the belt support service. The plurality of ball bearings are preferably supported by a bearing cage between the drum and the belt support surface.

The present invention is also directed to a drum assembly for being driven by a drive mechanism to drive a continuous belt having a plurality of drive teeth openings. The drum assembly includes a drum portion configured for being non-rotatively coupled to the drive mechanism, a plurality of drive teeth fixably coupled to the drum portion and extending outwardly from the drum portion for being received within corresponding drive teeth openings of the belt and a belt support service movably supported about the drum portion so as to move substantially independent of the drum portion.

The present invention is also directed to a belt transfer system including a continuous belt having a plurality of drive teeth openings, a drive shaft, a plurality of teeth fixedly coupled to the drive shaft and extending into the drive teeth openings to drive the belt and a low friction interface between the belt and the drive shaft such that the belt moves independent of the drive shaft.

DETAILED DESCRIPTION OF THE PREFERRED EMBODIMENT

Figure 1:
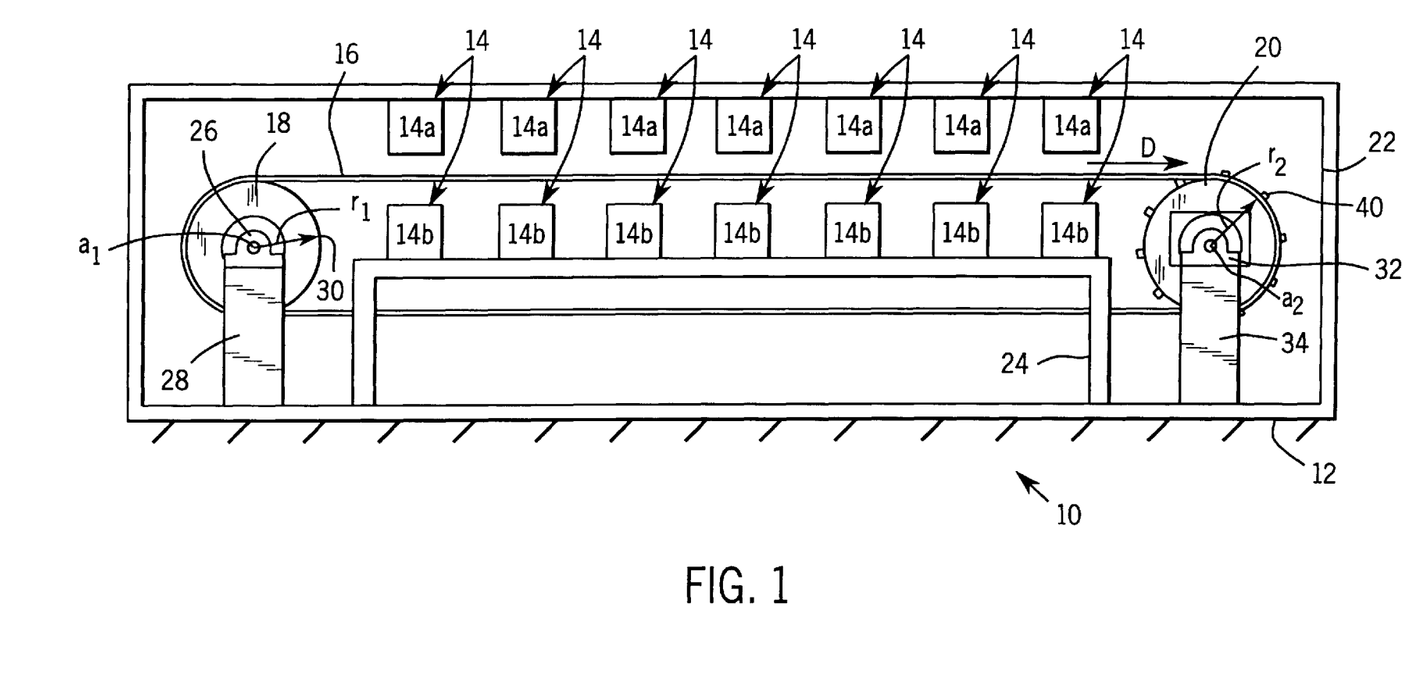
FIG. 1 is a schematic side view of a can end press including a transfer belt.

Referring to FIG. 1, a schematic representation of a can end press 10 includes a frame 12, a plurality of stamping stations 14, a continuous can end transfer belt 16, a belt support drum 18, and a belt drive assembly 20. Each station 14 may include an operating portion 14a and a belt and can end support portion 14b. Portions 14a are supported by upper support frame 22, and portions 14b are supported by lower support frame 24. Frames 22 and 24 are fixed to and part of the main support frame 12. Belt support drum 18 is rotatably supported by bearings 26, which are supported by bearing supports 28 fastened to frame 12. More specifically, drum 18 includes a cylindrical surface 30 located at a radius r1 from the rotational axis defined by bearings 26.

Belt drive assembly 20 is rotatably supported by a positioner 32 and the corresponding bearings thereof (not shown). Positioner 32 and the associated bearing rotatably support assembly 20 about an axis a2, and positioner 32 and the associated bearings are supported by support 34 so that axes a1 and a2 are substantially parallel. By way of example only, positioner 32 may include an appropriate gear drive and electric motor mechanically connected to a shaft including a longitudinal axis which is coincident with axis a2 for rotatably supporting assembly 20.

Turning now to the general operation of can end press 10, each station 14 may produce one progressive stamping operation on a can end. For example, beginning with a can end located at the leftmost station 14, this station operates as a bubble station. The electric motor of positioner 32 is then stepped to move the can end one station over, wherein the can end button is formed, the motor of positioner 32 is then stepped to move the can end to the third station over, wherein further features of the can end are press formed, and in a similar manner, the electric motor of positioner 32 is controlled to move the can end from station 14 to station 14 until the completed can end is delivered to the rightmost end of the machine by transfer belt 16. (Of course, positioner 32 may be located on either end of press 10.)

By way of example, transfer belt 16 may be a continuous metallic belt which is supported on the surfaces of drum 18 and assembly 20, wherein drive assembly 20 rotates to move belt 16 in the direction D past stations 14. By way of specific example, belt 16 may be the type of belt disclosed in detail in U.S. Pat. No. 4,946,028, issued to Eichmann et al. on Aug. 7, 1990. The complete disclosure of the '028 patent is incorporated herein by reference.

Figure 1A:
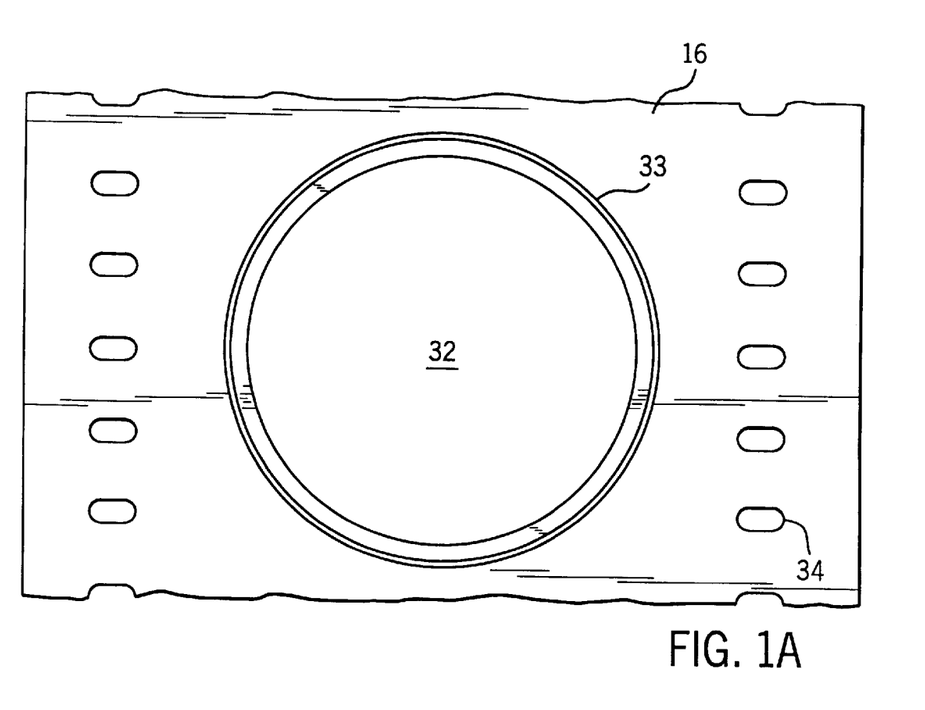
FIG. 1A is a top view of the transfer belt of FIG. 1.

As shown by FIG. 1A, belt 16 includes an aperture 32, a groove 33 and a plurality of drive pin or teeth openings 34. Aperture 32 is sized for receiving a can end support. Groove 33 prevents inadvertent rotation of the can end support. Drive teeth openings 34 extend through belt 16 and receive drive teeth 40.

Figure 2:
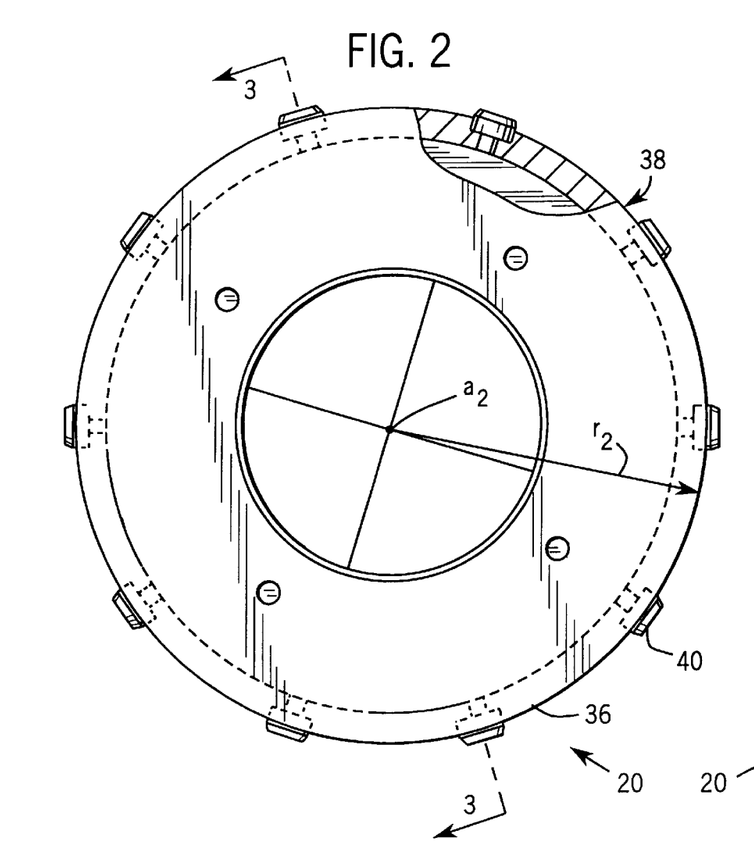
FIG. 2 is a side view of a conventional transfer belt drive drum.
Figure 3:
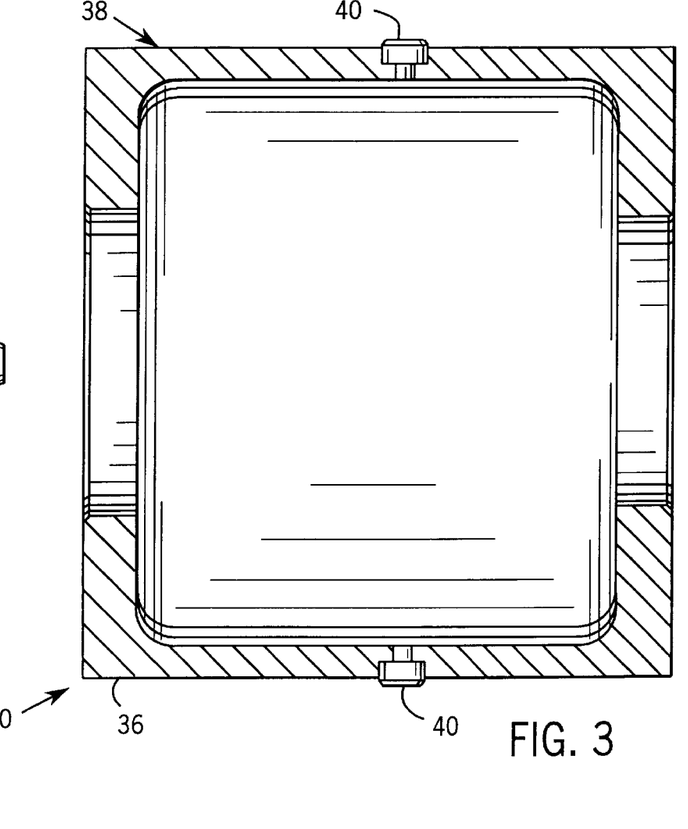
FIG. 3 is a sectional view of the drive drum of FIG. 2 taken along line 3—3.

Turning now to FIGS. 2 and 3, a drive belt assembly 20 includes a drive drum 36 having a cylindrical surface 38 located at a radius r2 from the rotational axis a2 thereof. Drum 36 also includes a plurality of drive teeth or pins 40 which cooperate with associated drive pin or teeth openings within transfer belt 16. Pins 40 cooperate with the drive teeth openings in belt 16 so that positioner 32 can accurately step belt 16 and the associated can ends to successive stations 14. However, this conventional embodiment of assembly 20 may produce excessive wear in belt 16 and the drive teeth openings thereof. Accordingly, the positioning accuracy of positioner 32 reduces as belt 16 is worn, and the can ends produced by press 10 are either of poor quality or unusable.

Figure 4:
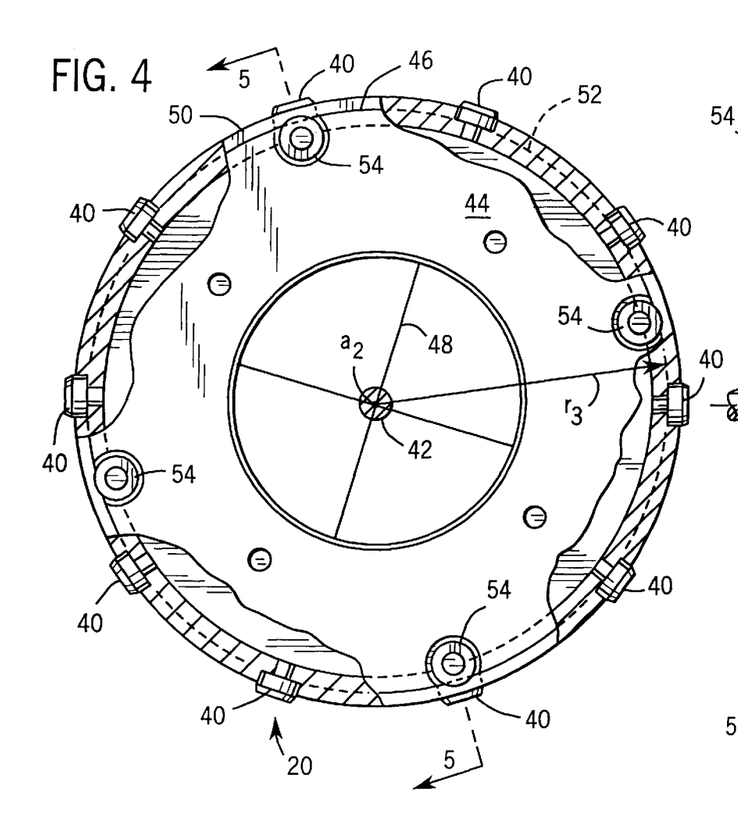
FIG. 4 is a side view of a transfer belt drive drum in accordance with the present invention.
Figure 5:
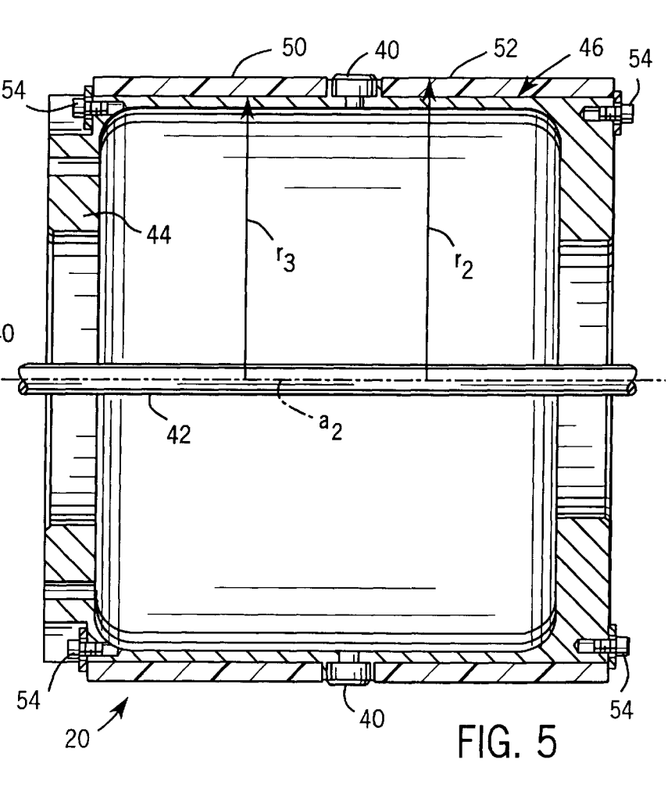
FIG. 5 is a sectional view of the drive drum of FIG. 4 taken along line 5—5.

Turning to FIGS. 4 and 5, the present embodiment of a drive belt assembly 20 according to the present invention includes a drive shaft 42 mechanically coupled to positioner 32 for rotation about its longitudinal axis which is coincident with rotational axis a2. Assembly 20 also includes a drum portion 44 which includes a bearing surface 46 at a first radius r3 from axis a2. Drum portion 44 is mechanically fixed to shaft 42 by a spider assembly 48 so that bearing surface 46 rotates at a constant radius about axis a2. Assembly 20 also includes a pair of slip rings 50 and 52 slidably supported upon surface 46 as illustrated in FIGS. 4 and 5. Slip rings 50 and 52 include an outside surface having the radius r2 from axis a2. Drive pins 40 are fixed to drum 44 and are located between slip rings 50 and 52. Retaining washer and bolt assemblies 54 are engaged with drum portion 44, as shown in FIGS. 4 and 5, to hold slip rings 50 and 52 onto drum 44. The inside surface of rings 50 and 52 cooperate with bearing surface 46 to provide a bearing between rings 50 and 52 and shaft 42 so that rings 50 and 52 may rotate relative to shaft 42 while the outside surfaces 50 and 52 remain at radius r2 from axis a2.

In operation, belt 16 contacts the outside surfaces of rings 50 and 52 so that assembly 20 supports belt 16 within press 10. However, unlike the drive assembly of FIGS. 2 and 3, the force to move belt 16 is not transmitted from shaft 42 to belt 16 as a result of the friction force between belt 16 and the outside surface of rings 50 and 52 because rings 50 and 52 can rotate freely relative to drum 44. Accordingly, substantially all of the force required to move belt 16 is applied from pins 40 to the pin openings of belt 16. Furthermore, by eliminating the transfer of drive force from drum 44 to belt 16, the drive forces between drum 44 and pins 40 do not interact to wear out the pin openings in belt 16.

By way of example only, rings 50 and 52 may be fabricated from a plastic such as Teflon and used with or without a lubricant between the inside surface thereof and the bearing surface of drum 44. Furthermore, belt 16 has generally the same can end aperture structure as disclosed in U.S. Pat. No. 4,946,028, but as will be obvious to one skilled in the art, the drive pin configuration of the belt disclosed in the '029 patent would be reconfigured to include the drive pin openings along the center of the belt, rather than along the sides of the belt.

Figure 6:
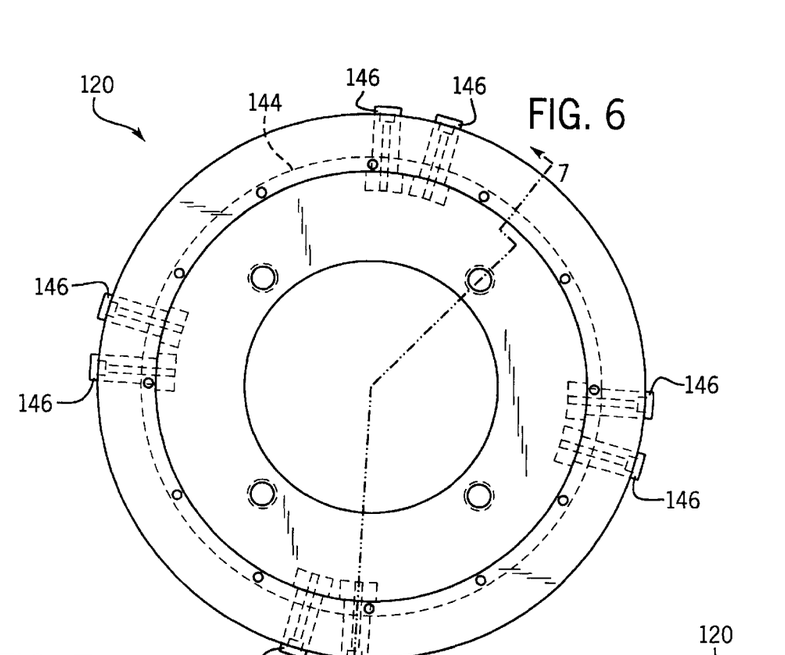
FIG. 6 is an end view of an alternate embodiment of a transfer belt drive drum in accordance with the present invention.
Figure 7:
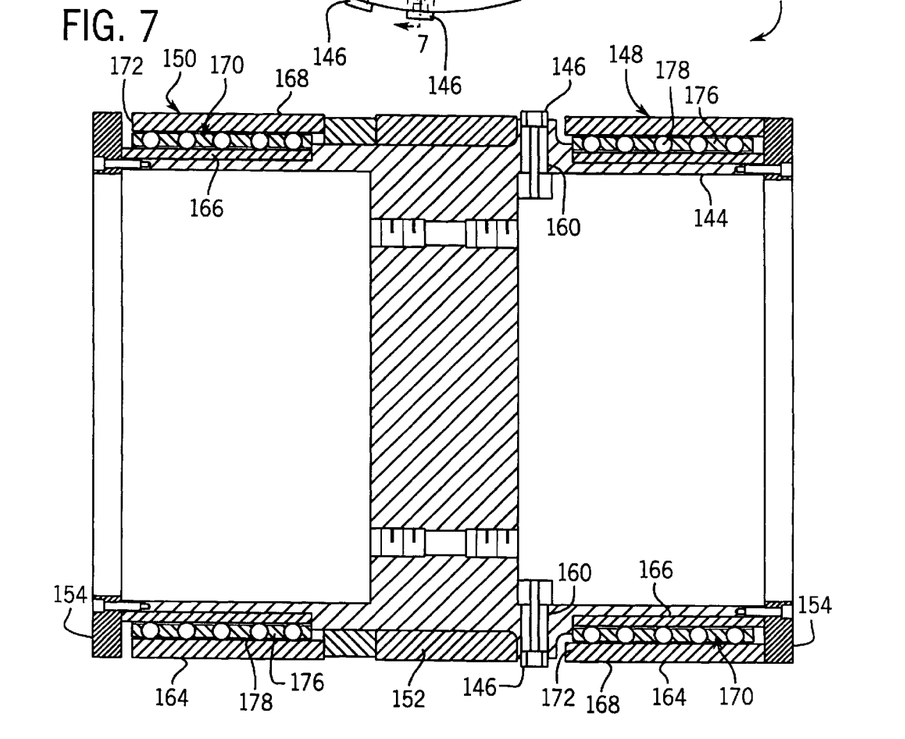
FIG. 7 is a sectional view of the drive drum of FIG. 6 taken along lines 7—7.

FIGS. 6 and 7 illustrate belt drive assembly 120, an alternate embodiment of belt drive assembly 20 shown in FIGS. 4 and 5. FIG. 6 is an end elevational view of belt drive assembly 120. FIG. 7 is a sectional view of belt drive assembly 120 taken along lines 6—6 of FIG. 6. Belt drive assembly 120 includes drum portion 144, drive pins or teeth 146, outer belt supports 148, 150, inner belt support 152 and end retainers 154. Drum portion 144 preferably comprises a hollow aluminum drum configured for being fixedly coupled to drive shaft 42 by spider assembly 48 (shown in FIGS. 4 and 5). Drum portion 144 supports outer belt supports 148, 150 and 152. Drum portion 144 further supports drive pins 146.

Drive pins 146 are fixedly coupled to drive shaft 42 (shown in FIGS. 4 and 5) via drum portion 144. In the preferred embodiment illustrated, drive pins 146 are mounted within bores 160 radially extending through drum portion 144. Alternatively, drive pins 146 may be integrally formed as part of drum portion 144 or may be fixedly coupled to drive shaft 42 by various other connecting structures. Drive pins 146 outwardly project from drum portion 144 so as to engage corresponding pin openings 34 (shown in FIG. 1A) to drive belt 16 (shown in FIG. 1A) upon being driven by drive shaft 42 (shown in FIGS. 4 and 5).

Outer belt supports 148 and 150 are positioned on opposite sides of drive pins 146 to provide belt supporting surfaces 164 for supporting belt 16 about drive shaft 42 and about drum portion 144. Belt supporting surfaces 164 are rotatably supported relative to drum portion 144 and drive shaft 42 so as to freely rotate relative to drum portion 144 and drive shaft 42.

In the preferred embodiment illustrated, outer belt supports 148 and 150 each include inner ring 166, outer ring 168 and bearing assembly 170. Inner ring 166 is a generally annular ring or cylinder of hardened tool steel encircling drum portion 144. Inner ring 166 provides an inner race for bearing assembly 170. Although inner ring 166 is illustrated as comprising an independent annular ring encircling drum portion 144, inner ring 166 may alternatively be omitted where the outer cylindrical surface of drum portion 144 is of a sufficient hardness to provide an inner race for bearing assembly 170.

Outer ring 168 is a generally annular ring or cylinder encircling bearing assembly 170 opposite inner ring 166. In the preferred embodiments illustrated, outer ring 168 has an axial length sized so as to create a gap 172 for permitting axial movement of belt support surface 164 relative to drum portion 144 and drive shaft 42 (shown in FIGS. 4 and 5). Gap 172 is preferably sized large enough for aiding the alignment of pins 146 with drive pin openings 34 and small enough to prevent excessive movement of drive pins 46 relative to openings 34. Although enlarged for purposes of illustration, each gap 172 preferably has an axial width of between about fifteen-thousandth of an inch and twenty-thousandth of an inch.

Outer ring 168 is preferably formed from hardened tool steel so as to provide an outer race for bearing assembly 170. Preferably, the outer cylindrical surface of outer ring 168 also serves as a belt supporting surface in engagement with belt 16 (shown in FIG. 1A). Although outer ring 168 is illustrated as providing both an outer race for bearing assembly 170 and a belt support surface, these functions may alternatively be provided by separate rings encircling one another. Outer ring 168 is movably supported about drum portion 144 by bearing assembly 170.

Bearing assembly 170 movably supports outer ring 168 relative to inner ring 166, drum portion 144 and drive shaft 42. In particular, bearing assembly 170 allows rotation of outer ring 170 as well as axial movement of outer ring 170 relative to inner ring 166 and drum portion 144. In the embodiment illustrated, bearing assembly 170 comprises an annular bearing cage 176 containing and supporting a plurality of ball bearings 178 about drum portion 144 between inner ring 166 and outer ring 168. Because bearing assembly 170 preferably comprises ball bearings 178 supported by bearing cage 176, virtually all friction between belt support surface 164 and drum portion 144 is eliminated. As a result, drive pins 146 more easily align with drive pin openings 34 in belt 16 with reduced wear to drive pins 146 and belt 16 to prolong belt life.

Alternatively, bearing assembly 170 may comprise any one of a variety of other well known bearing structures and materials for permitting either or both rotational and axial movement of the belt support surface 164 relative to drum portion 144 and drive shaft 42. For example, bearing assembly 170 may alternatively comprise roller bearings or rings of material having a low coefficient of friction such as polytetrafluoroethylene (commonly known as TEFLON). Although bearing assembly 170 is illustrated as movably supporting outer ring 168 relative to drum portion 144, belt drive assembly 120 may alternatively be configured such that bearing assembly 170 itself provides a belt support surface for directly contacting and supporting belt 16 so as to permit free relative or independent movement of belt 16 relative to drum portion 144 and drive shaft 42.

Inner belt support 152 centrally extends between outer belt supports 148 and 150 about drum portion 144. Belt support 152 provides an additional belt support surface 178 or 180 for supporting belt 16 about drum portion 144. Belt support 152 preferably comprises an annular ring of low friction material encircling drum portion 144. Preferably, belt support 152 comprises an annular ring of polytetrafluoroethylene. As a result, belt support 152 freely rotates relative to drum portion 144 and drive shaft 42. Because belt support 152 rotates independently of drum portion 144, drive pins 146 more easily align with drive pin openings 34 of belt 16.

Retainers 154 comprise annular rings bolted to drum portion 44 on opposite ends of drum portion 44. Retainers 154 capture and retain outer belt supports 148 and 150 on drum portion 144. As a result, belt drive assembly 120 may be easily and inexpensively manufactured by simply mounting outer belt supports 148 and 150 over the opposite ends of drum portion 144 and securing retainers 154 to drum portion 144.

The preferred embodiments of the present invention have been disclosed by way of example and it will be understood that other modifications may occur to those skilled in the art without departing from the scope and spirit of the appended claims. By way of specific example, assembly 20 illustrated in FIGS. 4 and 5 could be modified to eliminate drum 44, and drive pins 40 could be supported directly by a structure such as a spider fastened to shaft 42. Additionally, rings 50 and 52 would be replaced with corresponding drums including a belt support surface and rotatably supported upon shaft 42 by appropriate bearings (e.g., so that the belt support surface may freely move relative to shaft 42 at a radius r2 from rotational axis a2). Additionally, depending upon the type of belt and can end press associated therewith, the drive pin opening configuration of belt 16 and the drive pin 40 configuration on assemblies 20 and 120 may be modified to accommodate the particular belt and press 10.

What is claimed is:

1. A belt drive assembly for driving a continuous belt having a plurality of drive teeth openings, the belt drive assembly comprising:

a drive shaft;

a first belt support surface having a first coefficient of friction and movably supported relative to the drive shaft so as to move substantially independent of the drive shaft; and a second belt support surface having a second coefficient of friction and coupled to the drive shaft, the second surface having a coefficient of friction less than the first coefficient of friction;

a plurality of drive teeth fixedly coupled to the drive shaft and extending outwardly beyond the first and second belt support surface surfaces for being received within corresponding drive teeth openings of the belt.

2. The belt drive assembly of claim 1 wherein the first belt support surface rotatably moves substantially independent of the drive shaft.

3. The belt drive assembly of claim 1 wherein the first belt support surface axially moves substantially independent of the drive shaft.

4. The belt drive assembly of claim 1 including:

a drum nonrotatable coupled to the drive shaft about the drive shaft, wherein the drum interconnects the drive shaft and the first belt support surface.

5. The belt drive assembly of claim 4 including:

a bearing between the first belt support surface and the drum for movably supporting the first belt support surface independent of the drum.

6. The belt drive assembly of claim 5 wherein the bearing includes:

a plurality of ball bearings disposed between the drum and the first belt support surface.

7. The belt drive assembly of claim 5 including:

an inner ring encircling the drum; and an outer ring encircling the inner ring, wherein the outer ring defines the first belt support surface and wherein the bearing is positioned between the inner ring and the outer ring.

8. The belt drive assembly of claim 1 including:

a bearing coupled between the first belt support surface and the drive shaft.

9. The belt drive assembly of claim 8 including:

an outer cylindrical surface coupled to the drive shaft; and an inner cylindrical surface coupled to the first belt support surface, wherein the bearing position is between the outer cylindrical surface and the inner cylindrical surface.

10. The belt drive assembly of claim 8 wherein the bearing includes:

a plurality of ball bearings.

11. The belt drive assembly of claim 10 including:

a bearing cage positioned between the inner cylindrical surface and the outer cylindrical surface, wherein the bearing cage supports the plurality of ball bearings.

12. The belt drive assembly of claim 1 wherein the second belt support surface is formed from polytetrafluoroethylene.

13. A drum assembly for being driven by a drive mechanism to drive a continuous belt having a plurality of drive teeth openings, the drum assembly comprising;

a drum portion configured for being nonrotatably coupled to the drive mechanism;

a plurality of drive teeth fixedly coupled to the drum portion and extending outwardly from the drum portion for being received within corresponding drive teeth openings of the belt; and a first belt support surface having a first coefficient of friction and movably supported about the drum portion so as to move substantially independent of the drum portion; and a second belt support surface having a second coefficient of friction and coupled to the drum portion, the second coefficient of friction being less than the first coefficient of friction.

14. The drum assembly of claim 13 wherein the second belt support surface is rotatably coupled to the drum portion.

15. The drum assembly of claim 14 wherein the first belt support surface axially moves relative to the drum portion.

16. A belt transfer system comprising:

a continuous belt having a plurality of drive teeth openings;

a drive shaft;

a plurality of teeth fixedly coupled to the drive shaft and extending into the drive teeth openings to drive the belt; and a low friction interface coupled between the belt and the drive shaft such that the belt moves independent of the drive shaft.

a first belt support surface having a first coefficient of friction and movably supported relative to the drive shaft on a first axial side of the plurality of teeth;

a second belt support surface having a second coefficient of friction and movably supported relative to the drive shaft on a second axial side of the plurality of teeth; and a third belt support surface having a third coefficient of friction and coupled to the drive shaft between the first and second belt support surfaces, the third coefficient of friction being less than the first and second coefficients of friction.

17. The belt transfer system of claim 16 including:

a bearing coupled between the drive shaft and the first belt support surface.

18. The belt drive assembly of claim 1, wherein the first belt support surface rotatably moves substantially independent of the drive shaft and wherein the belt drive assembly additionally includes a third belt support surface movably supported relative to the drive shaft so as to rotate independent of the drive shaft and independent of the first belt support surface.

19. The drum assembly of claim 13, wherein the second belt support surface includes polytetrafluoroethylene.

20. The drum assembly of claim 13, wherein the first belt support surface rotates about an axis of the drum substantially independent of the drum and wherein the drum assembly additionally includes a third belt support surface movably supported about the drum for rotation about the drum independent of the drum and independent of the first belt support surface.

21. The belt transfer system of claim 16, wherein the third belt support surface includes polytetrafluoroethylene.

* * * * *

UNITED STATES PATENT AND TRADEMARK OFFICE
CERTIFICATE OF CORRECTION

PATENT NO.    : 6,070,713
DATED         : June 6, 2000
INVENTOR(S)   : Harry Eichmann It is certified that error appears in the above-identified patent and that said Letters Patent is hereby corrected as shown below:

Column 6,
Line 65, "nonrotatable" should be -- nonrotatably --;

Column 8,
Line 12, the word "and" should be deleted after "to drive the belt"; and
Line 15, the punctuation "." should be -- ; --.

Signed and Sealed this

Thirtieth Day of July, 2002

*Attest:*

JAMES E. ROGAN
*Attesting Officer*    *Director of the United States Patent and Trademark Office*